United States Patent [19]

Aldrich

[11] Patent Number: 5,531,641

[45] Date of Patent: Jul. 2, 1996

[54] RECREATIONAL VEHICLE AIR CONDITIONER CEILING GRILLE WITH REGISTER

[75] Inventor: Roger L. Aldrich, LaGrange, Ind.

[73] Assignee: The Dometic Corporation, LaGrange, Ind.

[21] Appl. No.: 302,582

[22] Filed: Sep. 7, 1994

[51] Int. Cl.$^6$ .................................................. B60H 1/26
[52] U.S. Cl. ........................ 454/100; 454/137; 454/232
[58] Field of Search .............................. 62/244; 454/99, 454/100, 137, 139, 140, 232, 233, 236

[56] References Cited

U.S. PATENT DOCUMENTS

| Re. 16,611 | 5/1927 | Lewis | 454/232 X |
|---|---|---|---|
| 2,032,572 | 3/1936 | Hammers et al. | 454/100 X |
| 3,855,814 | 12/1974 | Eubank | 454/100 X |
| 4,048,910 | 9/1977 | Weir . | |
| 4,641,502 | 2/1987 | Aldrich et al. | 62/244 |
| 4,672,818 | 6/1987 | Roth | 62/244 X |
| 4,709,623 | 12/1987 | Roth et al. . | |
| 4,727,728 | 3/1988 | Brown | 62/244 |
| 4,807,523 | 2/1989 | Radtke et al. | 454/137 |
| 4,982,583 | 1/1991 | Matsuda et al. | 62/244 |
| 5,307,645 | 5/1994 | Pannell | 62/244 |

FOREIGN PATENT DOCUMENTS

| 3411053 | 10/1985 | Germany | 454/137 |
|---|---|---|---|
| 97913 | 8/1979 | Japan | 454/99 |
| 56269 | 3/1989 | Japan | 62/244 |

Primary Examiner—Harold Joyce
Attorney, Agent, or Firm—Pearne, Gordon, McCoy & Granger

[57] ABSTRACT

An air conditioning system for a recreational vehicle is provided having a rooftop mounted air conditioning unit with an outlet for conditioned air and an inlet for return air and an air distribution system. The air distribution system includes ducts mounted between the roof and a ceiling of the recreational vehicle that are in communication with the outlet of the air conditioning unit. The air distribution system also includes registers mounted in openings of the ceiling to discharge the conditioned air from the ducts into various areas of the interior of the recreational vehicle. A ceiling grille is mounted at the ceiling below the air conditioning unit and has a return air grille and a closable register. The return air grille communicates the inlet of the air conditioning unit with the interior of the recreational vehicle. The closable register is positioned directly below the outlet of the air conditioning unit so that when the register is opened a proportionally larger amount of the conditioned air is discharged to rapidly cool the area of the interior below the air conditioning unit. When the register is closed the areas of the interior are equally cooled.

15 Claims, 2 Drawing Sheets 5,531,641

RECREATIONAL VEHICLE AIR CONDITIONER CEILING GRILLE WITH REGISTER

BACKGROUND OF THE INVENTION

1. Field of the Invention

The present invention relates to a recreational vehicle air conditioning system and, more particularly, to an air conditioning system having a ceiling grille with a register.

2. Description of Related Art

Recreational vehicles such as mobile homes, motor homes, travel trailers, fifth wheelers, recreational vans, and the like commonly have air conditioning systems to provide cool dehumidified air to an interior of the recreational vehicle. The air conditioning system typically has a rooftop mounted air conditioning unit and ducts for distributing the conditioned air. The conditioned air is discharged from the ducts into various areas and/or rooms through registers. The ducts and registers are designed so that generally equal amounts of the conditioned air are discharged from the registers to equally cool the various areas of the recreational vehicle.

When starting the air conditioning system it is often desirable to quickly cool a particular area of the recreational vehicle where the occupants will currently be such as, for example, a primary living space or galley. The air conditioning systems do not allow the particular area to be cooled more rapidly than other areas of the recreational vehicle. Additionally, it is not practical to provide an air conditioning unit capable of quickly cooling the entire interior of the recreational vehicle. Therefore, there exists a need in the art for an air conditioning system that can quickly cool a particular area of the recreational vehicle without increasing the capacity of the air conditioning unit that is economical and easy to install into both new and existing air conditioning systems.

SUMMARY OF THE INVENTION

The present invention provides a grille that solves the problem of not being able to quickly cool a particular area of a recreational vehicle. Problems of the related art are overcome by providing a grille having a closable register that is easily installed in both new and existing air conditioning systems.

According to the invention, there is provided a grille for use with an air conditioning system of a recreational vehicle having an air conditioning unit and an air distribution system. The air distribution system distributes conditioned air from the air conditioning unit to various areas within an interior of the recreational vehicle. The grille includes a panel, a return air grille mounted within the panel, and a closable register mounted within the panel. The return air grille is positioned to communicate a return air inlet of the air conditioning unit with the interior of the recreational vehicle. The closable register is positioned to communicate a conditioned air outlet of the air conditioning unit with a predetermined area of the interior of the recreational vehicle. The closable register is adapted for discharging a proportionally larger amount of the conditioned air when opened than the registers of the air distribution system so that the predetermined area is cooled more rapidly than the other areas of the interior of the recreational vehicle. When the closable register is closed the conditioned air is generally equally discharged from the registers of the air distribution system so that the areas of the interior of the recreational vehicle are generally equally cooled.

The grille of the present invention is easily installed or removed because it can be attached by known removable fastening methods. Furthermore, because the grille can be used with many standard air conditioning systems, the grille can be easily added to many existing recreational vehicle air conditioning systems.

BRIEF DESCRIPTION OF THE DRAWINGS

These and further features of the present invention will be apparent with reference to the following description and drawings, wherein.

DETAILED DESCRIPTION OF THE PREFERRED EMBODIMENT

Figure 1:
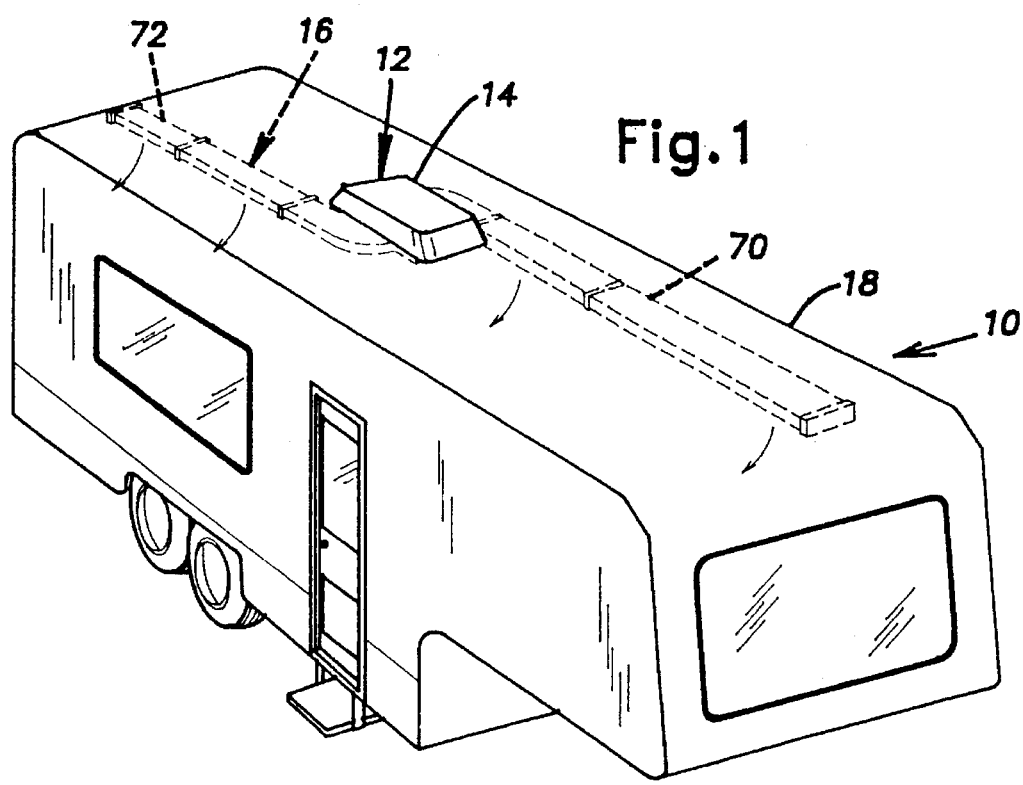
FIG. 1 is a perspective view of a recreational vehicle having an air conditioning system with a rooftop air conditioning unit.

FIG. 1 shows a recreational vehicle 10 having an air conditioning system 12 according to the present invention. As used herein the term "recreational vehicle" refers to mobile homes, motor homes, travel trailers, fifth wheelers, recreational vans, and the like. The air conditioning system 12 includes an air conditioning unit 14 and an air distribution system 16. The air conditioning unit 14 can be of any known design that cools or refrigerates air such as a compressor/condenser/evaporator type unit. The air conditioning unit is 14 mounted on a roof 18 of the recreational vehicle 10 and is supported by transversely extending rafters 20 (FIG. 3) of the roof 18.

Figure 2:
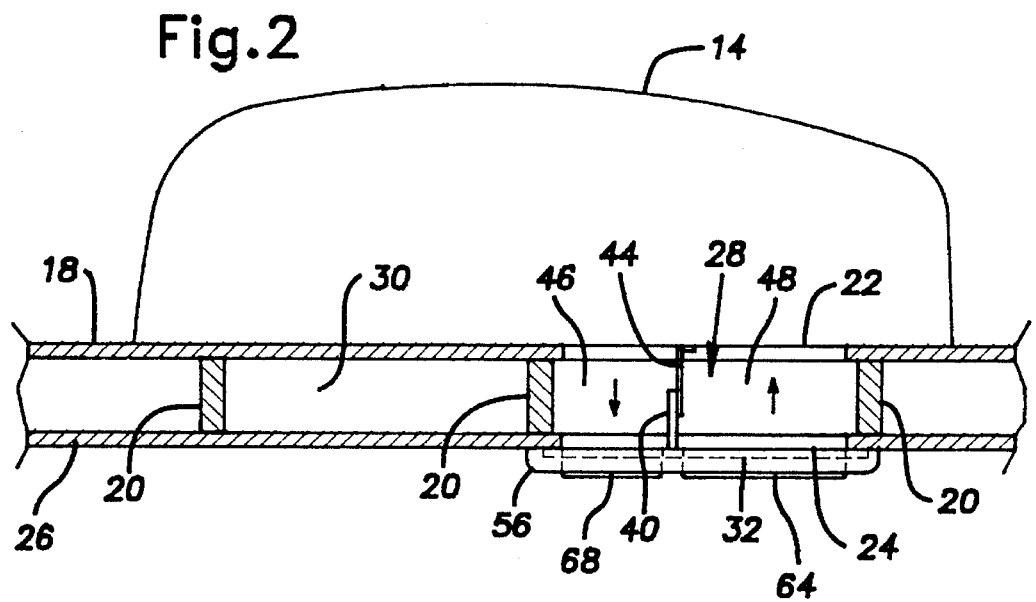
FIG. 2 is a fragmented elevational view, in partial cross section, of the air conditioning system of FIG. 1 at the interface between the air conditioning unit and the recreational vehicle.

As shown in FIG. 2, the air conditioning unit 14 is located over an opening 22 in the recreational vehicle roof 18 between two of the rafters 20. Preferably a gasket is located between the air conditioning unit 14 and the roof 18 to seal the roof opening 22. The roof opening 22 is typically square-shaped having sides of about 14 inches. There is also an opening 24 in a ceiling 26 of the recreational vehicle 10 directly below the roof opening 22 having generally the same dimensions as the roof opening 22. The openings 22, 24 are framed to form a plenum area 28 below the air conditioning unit 14. The plenum area 28 should be sealed to prevent communication with a cavity 30 between the roof 18 and the ceiling 26.

Figure 4:
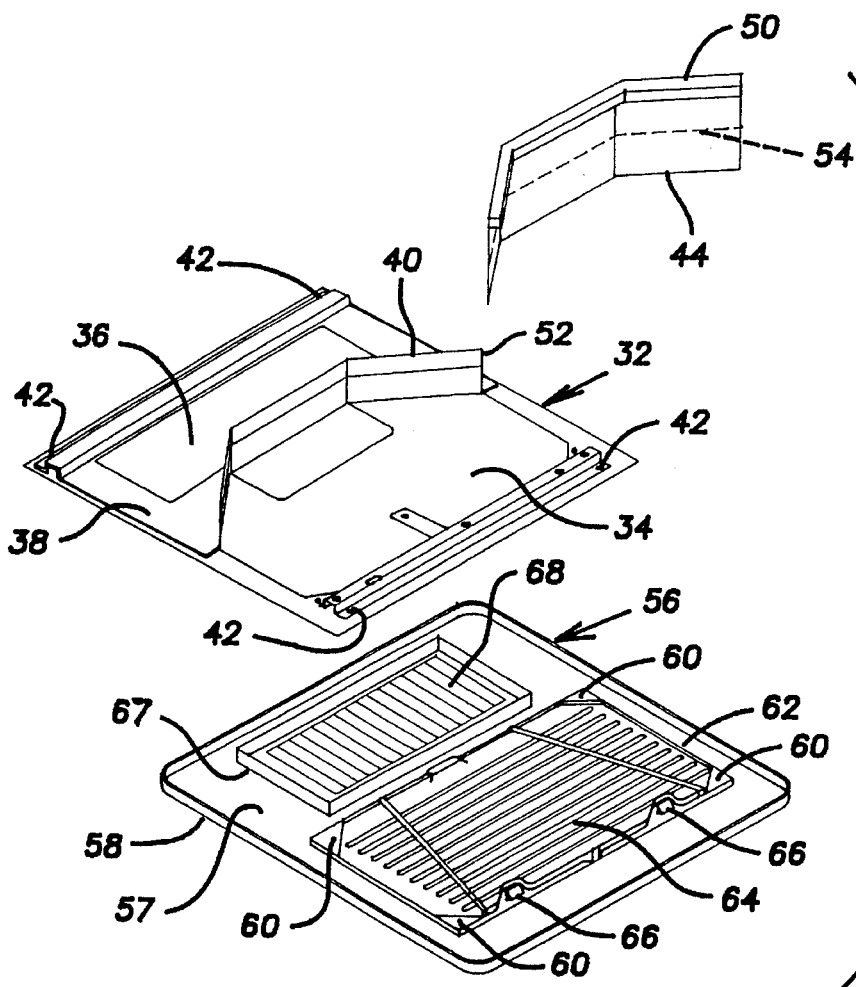
FIG. 4 is an exploded perspective view of a ceiling grille with register, ceiling template, and divider plate.

A ceiling template 32 is located at the ceiling 26 below the ceiling opening 24. As best seen in FIG. 4, the ceiling template 32 includes first and second openings 34, 36. Insulation 38 covers a top surface of the ceiling template 32 around the second opening 36. The insulation 38 also extends upwardly from the top surface of the ceiling template 32 forming an upwardly extending wall 40 between the first and second openings 34, 36. The ceiling template 32 also includes bolt openings 42 so that upwardly extending bolts can attach the ceiling template 32 to the air conditioning unit 14. A clamping force created between the ceiling template 32 and the air conditioning unit 14 firmly mounts the air conditioning unit 14 on the roof 18 above the opening 22. Preferably additional openings are provided for wood screws to firmly attach the ceiling template 32 to the ceiling 26 with a tight fit. The ceiling template 32 should be made of a material having adequate strength to support the loads required to mount the air conditioning unit 14, such as, for example, steel sheet.

As shown in FIG. 2 a divider plate 44 extends from the insulation wall 40 of the ceiling template 32 to the air conditioning unit 14 to divide and seal the plenum area 28 into a discharge portion 46 and a return portion 48. The discharge portion 46 is in communication with an outlet of the evaporator of the air conditioning unit 14 and the return portion 48 is in communication with an inlet of the evaporator of the air conditioning unit 14.

As best seen in FIG. 4, the divider plate 44 is shaped to conform with the insulation wall 40 dividing the openings 34, 36 of the ceiling template 32. A top edge of the divider plate 44 includes foam tape 50 for attaching the divider plate 44 to the air conditioning unit 14. A bottom edge of the divider plate 44 is attached to the insulation wall 40 of the ceiling template 32 by double sided foam tape 52. The divider plate 44 is preferably made of an insulating material. Preferably, the divider plate 44 includes at least one perforation 54 so that the height of the divider plate 44 can be adjusted during installation.

As shown in FIG. 2, a ceiling grille or cover 56 is located at the ceiling 26 below the ceiling template 32. As best shown in FIG. 4, the ceiling cover 56 has a generally rectangularly-shaped planar panel 57 with an upwardly extending flange 58 around the periphery of the panel 57. The ceiling cover 56 is sized to conceal the ceiling template 32 when installed. The ceiling cover 56 includes screw openings 60 for attaching the ceiling cover 56 to the ceiling template 32. The ceiling cover 56 is preferably molded of a plastic material.

The ceiling cover 56 also includes a first opening 62 located to be below the first opening 34 of the ceiling template 32 when installed. A return air grille 64 is removably mounted within the first opening 62 by spring elements 66. It is noted that the return air grille 64 could be integrally molded with the ceiling cover 56 or could be mounted by other known fastening means. The return air grille 64 communicates the return portion 48 of the plenum area 28 with the interior of the recreational vehicle 10 so that warm air can be returned to the air conditioning unit 14. Preferably, a filter is located over the return air grille 64 to prevent dirt accumulation on cooling surfaces of the air conditioning unit 14.

The ceiling cover 56 also includes a second opening 67 located to be below the second opening 36 of the ceiling template 32 when installed. A register 68 is mounted within the second opening 67 and is attached with an adhesive such as hot melt glue and preferably mechanical fasteners for additional holding power. It will be noted that the register 68 could be integrally molded with the ceiling grille or mounted by other known fastening means. The register 68 can be closed and opened to control the flow of air. The register of the preferred embodiment is a rectangularly-shaped sliding louvre type register that is commercially available. Other commercially available types of registers may be utilized such as, for example, an aircraft style louvre, a ball louvre, or a sliding damper. The register 68 should be capable of completely closing in a tight manner. If the register 68 does not tightly close, the high volume of air in the plenum area 28 will create an undesirable air whistle. The register can be fabricated from any suitable metal or plastic material.

The register 68 selectively communicates the discharge portion 46 of the plenum area 28 with the interior of the recreational vehicle 10 so that cool air can be discharged into the recreational vehicle 10 directly below the air conditioning unit. Preferably, a seal such as foam tape is located around the register 68 between the ceiling cover 56 and the ceiling template 32 to prevent cold air from leaking into the return portion 48 of the plenum area 28.

The air distribution system 16 includes ducts 70, 72 and registers 74 to distribute cold conditioned air from the air conditioning unit 14 to various areas of the recreational vehicle 10. The various areas of the recreational vehicle 10 can be either separate rooms or zones of a single interior space of the recreational vehicle 10. The ducts 70, 72 are in communication with the discharge portion 46 of the plenum area 28 and are located in the cavity 30 between the roof 18 and the ceiling 26. The ducts 70, 72 are typically rectangularly-shaped in cross section having a width of about 7 inches and a depth of about 1.25 inches to about 2.25 inches. The ducts 70, 72 are typically formed from galvanized sheet steel but could be manufactured from other materials. Preferably, the ducts 70, 72 are properly insulated to prevent condensation from forming on their surfaces or adjacent surfaces during operation of the air conditioning unit 14.

Figure 3:
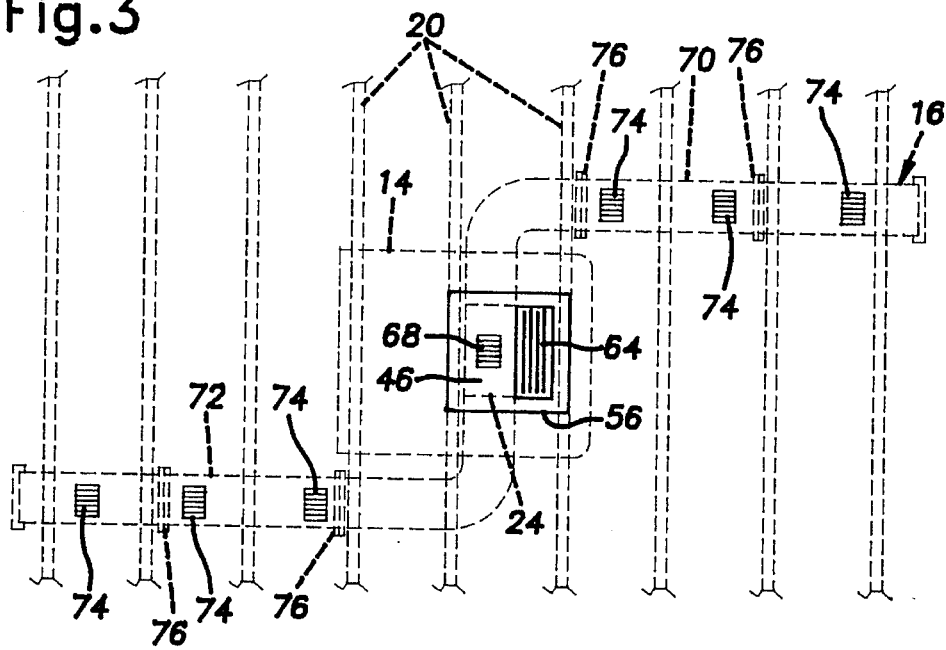
FIG. 3 is a fragmented plan view of the ceiling of the recreational vehicle of FIG. 1 in the area of the air conditioning system.

As seen in FIG. 3, the illustrated air distribution system 16 includes first and second ducts 70, 72. The first duct 70 extends from one side of the discharge portion 46 of the plenum area 28 toward the front of the recreational vehicle 10. The second duct 72 extends from the other side of the discharge portion 46 of the plenum area 28 toward the rear of the recreational vehicle 10. Each of the ducts 70, 72 are typically comprised of a number of duct segments to obtain a required duct length. The total duct length is typically about 12 feet to about 36 feet. Preferably, the ducts 70, 72 and particularly joints 76 between the duct segments are sealed to prevent condensation from forming on adjacent surfaces during operation of the air conditioning unit 14.

Along the bottom of each duct 70, 72 are registers 78 mounted through openings in the ceiling 26 to communicate the ducts 70, 72 with the various areas and/or rooms of the recreational vehicle 10. Each of the illustrated ducts 70, 72 includes three of the registers 74 but it is noted that other quantities may be required depending on the number and size of the areas to be cooled. Typically, there is a total of about 4 to about 8 registers. In a known manner the ducts 70, 72 and the registers 74 are designed so that a generally equal volume of cold conditioned air is delivered to each of the registers 74.

During operation, the air conditioning unit 14 downwardly delivers cold conditioned air to the discharge portion 46 of the plenum area 28. The cold conditioned air enters the ducts 70, 72 and in generally equal amounts is discharged from the registers 74 into the recreational vehicle 10 to generally equally cool the different areas of the recreational vehicle 10. Warm air within the recreational vehicle enters the return air grille 64 into the return portion 48 of the plenum area 28. From the return portion 48 of the plenum area 28 the warm air enters the air conditioning unit 14 and is cooled before again being discharged into the recreational vehicle 10.

When it is desirable to quickly cool the local area of the recreational vehicle 10 directly below the air conditioning unit 14, the operator manually opens the register 68 in the ceiling cover 56. When the register 68 is open, the static pressure in the plenum area 28 at the register 68 is lower than the static pressure in the ducts 70, 72. The difference in static pressure causes a majority of the cold conditioned air discharged from the air conditioning unit 14 to bypass the ducts 70, 72 and discharge from the register 68. Therefore, a larger volume of the cold conditioned air is discharged from the register 68 into the local area directly below the air conditioning unit 14 and the local area is cooled more rapidly than the remainder of the recreational vehicle 10.

The operator tightly closes the register 68 once the local area directly below the air conditioning unit 14 has been rapidly cooled to a desired temperature. When the register 68 is closed the cold conditioned air entering the discharge portion 46 of the plenum area 28 enters the ducts 70, 72 and is generally equally discharged from the registers 74 in the ducts 70, 72 to cool the remainder of the recreational vehicle 10. The procedure is repeated whenever a rapid cool down of the local area below the air conditioning unit 14 is desired.

Although a particular embodiment of the invention has been described in detail, it will be understood that the invention is not limited correspondingly in scope, but includes all changes and modifications coming within the spirit and terms of the claims appended hereto.

What is claimed is:

1. A grille for use with an air conditioning system of a recreational vehicle, the air conditioning system including an air conditioning unit mounted on a roof of the recreational vehicle, a ceiling template mounted to the air conditioning unit at the ceiling of the recreational vehicle and spaced from the air conditioning unit to form a plenum chamber between the ceiling template and the air conditioning unit, the ceiling template having first and second openings, a divider mounted within the plenum chamber to divide the plenum chamber into a return portion and a discharge portion, the return portion in communication with the inlet of the air conditioning unit and the first opening of the ceiling template, the discharge portion in communication with the outlet of the air conditioning unit and the second opening of the ceiling template, at least one duct in communication with the discharge portion of the plenum chamber, and registers located in the duct to distribute conditioned air from the air conditioning unit to various areas within an interior of the recreational vehicle, said grille comprising a panel, a return air grille mounted within said panel and positioned to communicate the first opening of the ceiling template with the interior of the recreational vehicle, and a closable register mounted within said panel and positioned to communicate the second opening of the ceiling template with a predetermined area of said interior of the recreational vehicle, wherein said closable register is located in a plane generally perpendicular to a direction of flow of conditioned air entering the discharge portion of the plenum chamber through the outlet of the air conditioning unit so that a larger amount of conditioned air is discharged from the discharge portion of the plenum chamber through said closable register than through the registers of the duct when said closable register is open.

2. The grille, according to claim 1, wherein said closable register is positioned to be in a plane generally parallel to a plane containing the outlet of the air conditioning unit and facing the outlet of the air conditioning unit.

3. The grille according to claim 2, wherein the outlet of the air conditioning unit is located in a generally horizontal plane and said closable register is positioned to be in a generally horizontal plane below the outlet of the air conditioning unit.

4. The grille according to claim 1, wherein said closable register is sealed when closed.

5. The grille according to claim 1, wherein said panel is generally planar such that said return air grille and said closable register are located in a common plane and has an upwardly extending flange at a periphery of said panel.

6. The grille according to claim 1, wherein said panel is molded plastic.

7. The grille according to claim 5, wherein at least a portion of said closable register is integrally molded with said panel.

8. An air conditioning system for installation in a recreational vehicle having a roof and an interior with a ceiling, said air conditioning system comprising:

an air conditioning unit to be mounted on the roof of the recreational vehicle and having an outlet for conditioned air and an inlet for return air;

a ceiling template to be mounted to said air conditioning unit at the ceiling of the recreational vehicle and spaced from said air conditioning unit to form a plenum chamber between said ceiling template and said air conditioning unit, said ceiling template having first and second openings;

a divider to be mounted within said plenum chamber to divide said plenum chamber into a return portion and a discharge portion, said return portion in communication with said inlet of said air conditioning unit and said first opening of said ceiling template, said discharge portion in communication with said outlet of said air conditioning unit and said second opening of said ceiling template;

at least one duct to be mounted between the roof and the ceiling of the recreational vehicle in communication with said discharge portion of said plenum chamber;

registers to be mounted in openings of the ceiling of the recreational vehicle for communicating said duct with various areas of the interior of the recreational vehicle; and a ceiling grille to be mounted at the ceiling and below said ceiling template and having a return air grille and a closable register, said return air grille positioned for communicating said first opening of said ceiling template with the interior of the recreational vehicle, said closable register positioned for selectively communicating said second opening of said ceiling template with the interior of the recreational vehicle below said air conditioner unit, wherein said second opening of said ceiling template is located in a plane generally parallel to a plane containing said outlet of said air conditioning unit and facing said outlet of the air conditioning unit such that when said closable register is open a proportionally larger amount of conditioned air is discharged from said discharge portion of said plenum chamber through said closable register than through said registers of said duct.

9. The air conditioning system according to claim 8, wherein said outlet of said air conditioning unit is located in a generally horizontal plane and said second opening of said ceiling template is positioned to be in a generally horizontal plane directly below said outlet of said air conditioning unit when said ceiling grille is mounted at the ceiling.

10. The air conditioning system according to claim 8, wherein said closable register is sealed when closed.

11. The air conditioning system according claim 8, wherein said ceiling grille is molded plastic and at least a portion of said closable register is integrally molded.

12. A recreational vehicle comprising:

a roof having an opening;

an interior space having various areas and a ceiling with an opening below said opening in said roof;

an air conditioning unit mounted on said roof over said opening in said roof and having an outlet for conditioned air and an inlet for return air;

a ceiling template mounted to said air conditioning unit at said opening of said ceiling to form a plenum chamber between said ceiling template and said air conditioning unit, said ceiling template having first and second openings;

a divider mounted within said plenum chamber to divide said plenum chamber into a return portion and a discharge portion, said return portion in communication with said inlet of said air conditioning unit and said first opening of said ceiling template, said discharge portion in communication with said outlet of said air conditioning unit and said second opening of said ceiling template;

at least one duct mounted between said roof and said ceiling and in communication with said outlet of said air conditioning unit;

registers mounted in said ceiling for communicating said duct with said various areas of said interior; and a ceiling grille mounted below said ceiling template and having a return air grille and a closable register, said return air grille communicating said first opening of said ceiling template with said interior, said closable register selectively communicating said second opening of said ceiling template with said interior below said air conditioning unit, wherein said second opening of said ceiling template is located in a plane generally parallel to a plane containing said outlet of said air conditioning unit and facing said outlet of said air conditioning unit such that when said closable register is open a proportionally larger amount of conditioned air is discharged from said discharge portion of said plenum chamber through said closable register than through said registers in said duct.

13. The recreational vehicle according to claim 12, wherein said outlet of said air conditioning unit is located in a generally horizontal plane and said second opening of said ceiling template is in a generally horizontal plane directly below said outlet of said air conditioning unit.

14. The recreational vehicle according to claim 12, wherein said closable register is sealed when closed.

15. The recreational vehicle according claim 12, wherein said ceiling grille is molded plastic and at least a portion of said closable register is integrally molded.

* * * * *